(12) United States Patent
Bouaziz

(10) Patent No.: US 11,535,100 B2
(45) Date of Patent: Dec. 27, 2022

(54) CONTROL DEVICE AND METHOD FOR THE VOICE-BASED OPERATION OF A MOTOR VEHICLE

(71) Applicant: AUDI AG, Ingolstadt (DE)

(72) Inventor: Tahar Bouaziz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 1019 days.

(21) Appl. No.: 16/317,470

(22) PCT Filed: Jan. 17, 2017

(86) PCT No.: PCT/EP2017/050904
§ 371 (c)(1),
(2) Date: Jan. 11, 2019

(87) PCT Pub. No.: WO2018/010853
PCT Pub. Date: Jan. 18, 2018

(65) Prior Publication Data
US 2019/0241069 A1 Aug. 8, 2019

(30) Foreign Application Priority Data
Jul. 12, 2016 (DE) .................. 102016212681.4

(51) Int. Cl.
G06F 3/16 (2006.01)
B60K 35/00 (2006.01)
(Continued)

(52) U.S. Cl.
CPC .......... B60K 35/00 (2013.01); B60R 16/0373 (2013.01); G06F 3/167 (2013.01);
(Continued)

(58) Field of Classification Search
CPC .............. B60K 35/00; B60K 2370/148; B60R 16/0373; G06F 3/167; G10L 15/22; G10L 2015/223
See application file for complete search history.

(56) References Cited

U.S. PATENT DOCUMENTS 4,797,924 A * 1/1989 Schnars ................ H04M 1/271
704/275
6,230,138 B1 5/2001 Everhart
(Continued)

FOREIGN PATENT DOCUMENTS

DE 101 91 732 B4 10/2005
DE 102004002010 B4 * 3/2006 ......... B60R 16/0373
(Continued)

OTHER PUBLICATIONS

International Search Report for PCT/EP2017/050904 dated Mar. 28, 2017.
(Continued)

Primary Examiner — Yongjia Pan
(74) Attorney, Agent, or Firm — Staas & Halsey LLP

(57) ABSTRACT

A voice recognition apparatus in a motor vehicle is configured to recognize at least one voice command, which is linked to at least one condition and which is related to the actuation of at least two functional units of the motor vehicle by a control device to provide voice-based operation of the motor vehicle by a vehicle occupant. The control apparatus is configured to generate, in accordance with the voice command, which is recognized by the voice recognition apparatus, a rule for actuating the at least two functional units according to the generated rule.

16 Claims, 1 Drawing Sheet

(51) Int. Cl.
  *B60R 16/037* (2006.01)
  *G10L 15/22* (2006.01)
(52) U.S. Cl.
  CPC ........ *G10L 15/22* (2013.01); *B60K 2370/148* (2019.05); *G10L 2015/223* (2013.01)

(56) References Cited

U.S. PATENT DOCUMENTS

| | | | |
|---|---|---|---|
| 6,240,347 B1 | 5/2001 | Everhart et al. | |
| 6,496,107 B1* | 12/2002 | Himmelstein | G07C 9/257 726/19 |
| 7,113,857 B2 | 9/2006 | Ilan | B60R 16/0373 701/49 |
| 7,437,488 B2* | 10/2008 | Ito | G06F 3/017 710/72 |
| 8,694,328 B1 | 4/2014 | Gormley | |
| 9,092,309 B2* | 7/2015 | MacNeille | G06Q 30/0265 |
| 9,440,606 B2* | 9/2016 | Lamprecht | B60R 16/037 |
| 9,493,130 B2* | 11/2016 | Penilla | G10L 25/63 |
| 9,809,185 B2* | 11/2017 | Visintainer | B60R 16/0373 |
| 2004/0143440 A1* | 7/2004 | Prasad | B60R 16/0373 704/E15.04 |
| 2006/0218244 A1* | 9/2006 | Rasmussen | H04L 67/12 709/218 |
| 2008/0046251 A1* | 2/2008 | Agapi | G10L 15/07 704/275 |
| 2010/0286983 A1 | 11/2010 | Cho | |
| 2013/0179173 A1* | 7/2013 | Lee | G06F 3/0487 704/275 |
| 2014/0074480 A1* | 3/2014 | Gratke | B60R 16/0373 704/E11.001 |
| 2014/0082501 A1* | 3/2014 | Bae | G06F 3/167 715/728 |
| 2014/0309885 A1* | 10/2014 | Ricci | G01C 21/3691 701/41 |
| 2015/0266356 A1* | 9/2015 | Fischer | G01S 19/14 700/275 |
| 2016/0260430 A1* | 9/2016 | Panemangalore | G06F 3/167 |

FOREIGN PATENT DOCUMENTS

| | | | | |
|---|---|---|---|---|
| DE | 10 2011 002 985 A1 | 8/2011 | | |
| DE | 10 2010 049 869 A1 | 5/2012 | | |
| DE | 10 2012 208 728 A1 | 11/2013 | | |
| DE | 10 2012 213 668 A1 | 5/2014 | | |
| DE | 10 2015 103 263 A1 | 9/2015 | | |
| DE | 10 2015 106 680 A1 | 11/2015 | | |
| EP | 1680309 B1 * | 4/2008 | ........... | B60R 16/037 |
| JP | S59102643 A * | 6/1984 | | |
| JP | S59102644 A * | 6/1984 | | |
| JP | S59102645 A * | 6/1984 | | |
| KR | 0175257 B1 * | 4/1999 | | |
| KR | 100188063 B1 * | 6/1999 | | |

OTHER PUBLICATIONS

German Office Action for German Application No. 10 2016 212 681.4 dated Oct. 17, 2016.
Office Action dated Nov. 10, 2020 for German Application No. 10 2016 212 681.4, 10 pages.
Chinese Office Action dated Aug. 9, 2021 from Chinese Patent Application No. 201780043499.6, with English language translation of summary of Examiner's comments, (8 pages total).
English Translation by WIPO dated Jan. 24, 2019 of the International Preliminary Report on Patentability in corresponding International Patent Application No. PCT/EP2017/050904.
Chinese Office Action dated Mar. 8, 2022 from Chinese Application No. 201780043499.6, with English language translation of summary of Examiner's comments, (7 pages total).
PCT/EP2017/050904, filed Jan. 17, 2017, Tahar Bouaziz, Audi AG.
DE 10 2016 212 681.4, filed Jul. 12, 2016, Tahar Bouaziz, Audi AG.

* cited by examiner

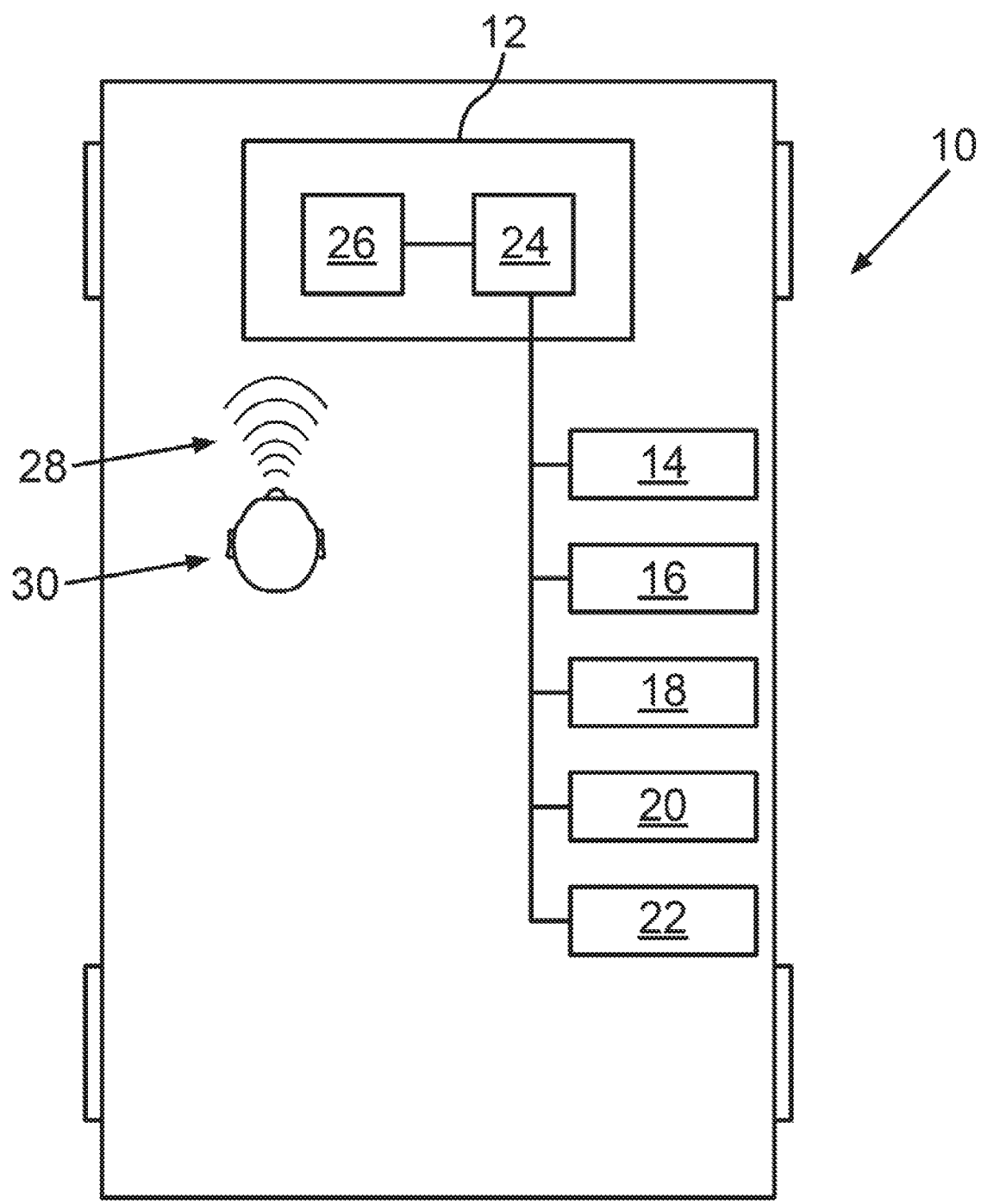

CONTROL DEVICE AND METHOD FOR THE VOICE-BASED OPERATION OF A MOTOR VEHICLE

CROSS REFERENCE TO RELATED APPLICATIONS

This application is the U.S. national stage of International Application No. PCT/EP2017/050904, filed Jan. 17, 2017, and claims the benefit thereof. The International Application claims the benefit of German Application No. 10 2016 212 681.4 filed on Jul. 12, 2016, both applications are incorporated by reference herein in their entirety.

BACKGROUND

Described below are a control device and a method for the voice-operated operation of a motor vehicle.

It is known per se that various functional units of a motor vehicle, such as for example a navigation system, can be controlled in a voice-based fashion. Therefore, for example DE 10 2010 004 869 A1 discloses a method and a device for making available a voice interface in a vehicle. Voice commands can be registered by the voice interface, wherein the voice commands are analyzed and assigned to a specific category on the basis of the analysis result, in order to facilitate the voice-based control.

DE 101 91 732 B4 also presents a method for the voice-based operation of a motor vehicle. In this context, spoken sentences for activating various vehicle accessories can be registered.

Furthermore, DE 10 2012 213 668 A1 presents a method and a device for operating a voice-controlled information system for a vehicle. A voice recognition unit can evaluate and recognize individual spoken words of a vehicle user. In this context, it is, for example, also possible that questions of a vehicle occupant with respect to the method of functioning of a specific functional unit of the motor vehicle can be registered by the voice recognition unit and then replied to on the part of the vehicle. The vehicle can have, for example, a start/stop automatic system, wherein the driver can ask, for example, why the engine has still not been switched off in the stationary state. On the vehicle side, the question is then responded to, for example, to the effect that the engine is not deactivated since the current external temperature is below a target value of 3° C.

The voice-based control of various functional units of a motor vehicle is frequently also relatively complex and less natural for a vehicle occupant. In addition, voice commands are usually also intended for a specific function, for example for the inputting of a destination, the pre-selection of a temperature setting or the like. The functional scope of the voice-based control of a motor vehicle is then relatively limited and is frequently also felt to be relatively laborious by the vehicle occupant.

SUMMARY

Described below are a control device and a method for the voice-operation of a motor vehicle, by which control device and method a motor vehicle can be controlled particularly easily and intuitively in a voice-based fashion.

The control device for the voice-based operation of a motor vehicle, as described herein, includes a voice recognition apparatus which is configured to recognize at least one voice command, which is linked to at least one condition and which is related to the actuation of at least two functional units of the motor vehicle, of a vehicle occupant. The voice recognition apparatus can have, for example, a microphone or a plurality of microphones which are configured to register the voice of the vehicle occupants. The voice recognition apparatus can then evaluate and recognize respectively registered voice commands. Furthermore, the control device has a control apparatus which is configured to generate, in accordance with the voice command which is recognized by the voice recognition apparatus, a rule for actuating the two functional units and to actuate the two functional units according to the generated rule.

In other words, the control device is configured to register, evaluate and recognize interleaved voice commands of vehicle occupants, wherein the respectively recognized voice commands can be converted, by the control apparatus, into corresponding rules for actuating the at least two functional units. As a result, it is possible to utter new types of voice commands which also bring about interleaved actions with respect to various functional units of the motor vehicle. A vehicle occupant can freely combine with one another substantially all the possible functions in the motor vehicle by the control device and can set up conditions as to the circumstances under which these various functions or functional units of the motor vehicle are to be operated and in what way.

Basically, the voice command which can be registered, evaluated and recognized by the voice recognition apparatus is always constructed in such a way that the command has a specific condition, as a result of which at least two actions are carried out in relation to respective functional units of the motor vehicle. In other words, the fulfillment of a specific condition always has connected to it the fact that at least two functional units of the motor vehicle are operated when the condition is satisfied in accordance with the uttered voice command. With respect to the conditions which can be recognized and evaluated, it is possible to use all the parameters and sensor data of the motor vehicle which are currently available whether this is because corresponding sensor apparatuses of the motor vehicle permit the checking of the respective conditions and/or because, for example, the respectively defined conditions can be checked by wireless reception of a wide variety of information, for example via a mobile radio link or internet connection.

It is therefore possible in a particularly easy way for a vehicle occupant to program in a voice-based fashion relatively complex and interleaved actions with respect to the method of operation of a wide variety of vehicle functions and/or functional units of the motor vehicle. The user requires for this no particular tools or apps and can create in an entirely intuitively voice-based fashion any desired rules which are bound to corresponding conditions and relationships between the functional units and further parameters.

One advantageous embodiment provides that the control apparatus is configured to actuate the two functional units of the motor vehicle repeatedly in accordance with the generated rule if it is registered that the at least one condition is satisfied without the vehicle occupant having to utter the voice command again. The vehicle occupant therefore does not have to utter the voice command again every time in order to cause the rule previously predefined by him in a voice-based fashion to be carried out. Instead by uttering the corresponding voice command he can cause the respective rule to be stored by the control device and to be continuously checked with respect to the satisfaction of the condition included therein. Whenever this condition is satisfied, the control apparatus actuates the two functional units automatically in accordance with the predefined rule. The vehicle occupant can therefore easily and comfortably configure and program in a voice-based fashion automatic responses with respect to the method of functioning of a wide variety of functional units of the motor vehicle, with the result that the motor vehicle can execute automatically and independently on an entirely user-specific basis a multiplicity of actions whenever the conditions which are defined by the vehicle occupant are satisfied.

A further advantageous embodiment provides that the voice recognition apparatus is configured to revise or to delete the generated rule in accordance with a further voice command, which is related to the rule, of the vehicle occupant or a further vehicle occupant. The vehicle occupant or else other vehicle occupants can therefore delete or change entirely easily in a voice-based fashion rules which have already been stored. The voice-based operator control therefore permits entirely easy and intuitive generation, revision and/or deletion of a wide variety of rules with respect to the method of functioning of the functional units of the motor vehicle.

According to a further advantageous embodiment, there is provision that the voice recognition apparatus is configured to recognize, on the basis of at least one predefined instruction, whether the rule is to be carried out only once or whether it is to be stored until the rule is changed or deleted. Therefore, a vehicle occupant can determine entirely conveniently whether a specific rule which has been defined on the basis of the voice command uttered by him is to be carried out only once or repeatedly as long as this rule is not changed or deleted. It is therefore possible, for example, for a vehicle occupant to be able to actuate a multiplicity of functional units of the motor vehicle by uttering a corresponding voice command, wherein this actuation takes place only once. Furthermore, it is, however, also possible for the vehicle occupant to define in a voice-based fashion that a rule which has been specified and generated by him once in the form of a voice command is to be carried out repeatedly insofar as the at least one condition which has been defined by him in relation to the utterance of the voice command is satisfied.

In a further advantageous refinement there is provision that the control device is configured to store the rule in a personalized fashion in a memory of the motor vehicle and/or of a vehicle-external server apparatus. If the rule or the multiplicity of rules are stored in a personalized fashion in a memory of the motor vehicle, there can be provision, for example, that it is checked whether the respective person who has also defined the rules is currently sitting in the motor vehicle. If this is the case, the corresponding rules are checked and carried out insofar as the conditions relating thereto are satisfied. The advantage of the personalized storage in a vehicle-external server apparatus is, in particular, that a wide variety of rules can be defined in a voice-based fashion which also applies to multiple vehicles, with the result that when using a wide variety of vehicles a user can access a multiplicity of rules which he has defined once in a voice-based fashion. This may be appropriate, for example, if the person possesses a multiplicity of vehicles or frequently drives a multiplicity of different vehicles, such as, for example, hire vehicles, vehicles of a company fleet or the like.

A further advantageous embodiment provides that the voice recognition apparatus is configured to recognize at least one condition which is included in the voice command and which describes a relationship between respective operating states of the two functional units. In other words, the voice recognition apparatus therefore may be configured to recognize if the condition includes the fact that the one functional unit is to be operated in a first predetermined fashion if the other functional unit is operated in a second predetermined fashion. For example, such a condition could be that ambient lighting of the vehicle is set to red if the air conditioning system has been set to 23° C. In this way, a vehicle occupant can therefore connect the method of operation of various functional units of the motor vehicle to one another by defining how specific functional units of the motor vehicle are to behave as a function of another functional unit of the motor.

In a further advantageous refinement there is provision that the voice recognition apparatus is configured to recognize at least one condition which is included in the voice command and which describes a relationship between a registered action of the vehicle occupant and between respective operating states of the two functional units. For example, it would be possible that the vehicle user defines that whenever he enters the motor vehicle a radio is always to be switched on and the ambient lighting is to be set to red. Likewise, the vehicle occupant can define, for example, that whenever he exits the vehicle specific actions, desired by him in this context, of various functional units of the motor vehicle are to be carried out. The control apparatus of the control device can be connected, for example, to very different sensors of the motor vehicle, such as, for example, seat belt sensors, seat occupation sensors, sensors which can monitor opening and closing of the vehicle doors or the like, in order to be able to check such conditions.

In a further advantageous refinement there is provision that the voice recognition apparatus is configured to recognize at least one condition which is included in the voice command and which describes a relationship between at least one parameter describing the surroundings of the vehicle, in particular the temperature of the surroundings, and respective operating states of the two functional units. For example, a user of the vehicle could define that as soon as it is registered that the external temperature is below 0° C., a seat heater of the motor vehicle is set to level 2, a windshield heater is switched on and an air conditioning system of the motor vehicle is set to maximum heating power as soon as it is registered that the respective user enters the motor vehicle. In order to check such conditions, the control apparatus can also be connected to a wide variety of on-board sensors, during the use of which these conditions can be checked. A user of the motor vehicle can therefore define in a voice-based fashion a multiplicity of rules which take into account, as a condition, specific specifications of the user with respect to the surroundings of the vehicle such as, for example, the temperature of the surroundings, levels of precipitation, traffic events and the like.

The behavior of very different functional units of the motor vehicle can therefore be adapted in a voice-based fashion and on a user-specific basis to respective boundary conditions of the surroundings which are to be checked.

The motor vehicle described below includes the control device or an advantageous embodiment of the control device.

In the method for the voice-based operation of a motor vehicle, a voice command, which is linked to at least one condition and is related to the actuation of at least two functional units of the motor vehicle, of a vehicle occupant, is recognized by a voice recognition apparatus. A rule for actuating the two functional units in accordance with the voice command which is recognized by the voice recognition apparatus is generated and the two functional units are actuated according to the generated rule by the control apparatus. Advantageous refinements of the control device are considered to be advantageous refinements of the method, wherein the control device executes the method.

Further advantages, features and details can be found in the following description of exemplary embodiments and with reference to the drawing. The features and combinations of features which are specified above in the description and the features and combinations of features which are shown below in the description of the figures can be used not only in the respectively specified combination but also in other combinations or alone without departing from the scope of the invention.

BRIEF DESCRIPTION OF THE DRAWINGS

The single FIGURE is a schematic illustration of a motor vehicle with a control device for the voice-based operation of various functional units of the motor vehicle.

DETAILED DESCRIPTION OF THE PREFERRED EMBODIMENT

A motor vehicle 10 with a control device 12 provides voice-based operation of a multiplicity of vehicle-side functional units 14, 16, 18, 20, 22. Specifically, a control apparatus 24 of the control device 12 is connected by signaling technology to a radio 14, an ambient lighting system 16, a seat heater 18, a windshield heater 20 and to an air conditioning system 22 of the motor vehicle 10. The control device 12 has a voice recognition apparatus 26 for registering, evaluating and recognizing a wide variety of voice commands 28 which are uttered by a vehicle occupant 30. The method of functioning of the control device 12 is explained in more detail below with reference to a plurality of examples.

The voice recognition apparatus 26 is configured to register, analyze and recognize the voice command 28. The voice command 28 includes here at least one condition which is directed at the actuation of the functional units 14, 16, 18, 20, 22. The control apparatus 24 is configured to generate, in accordance with the voice command 28 which is recognized by the voice recognition apparatus 26, a rule for actuating at least two of the functional units 14, 16, 18, 20, 22 and actuating them according to the rule.

For example, the vehicle occupant 30 can predefine, in the form of the voice command 28, that when the air conditioning system 22 is set to 23° C., the ambient lighting 16 is to illuminate the passenger compartment of the motor vehicle 10 in red. The vehicle occupant 30 can therefore utter interleaved voice commands which define the methods of functioning of the various functional units 14, 16, 18, 20, 22 in such a way that specific operating states or methods of operation of the functional units 14, 16, 18, 20, 22 are conditional on one another.

Moreover, it is, for example, also possible for the vehicle occupant 30 to express, in the form of the voice command 28, that whenever he enters the motor vehicle 10 the radio 14 switches on and the ambient lighting 16 is in turn to illuminate the passenger compartment of the vehicle in red. The vehicle occupant 30 can therefore also define in a voice-based fashion rules which connect a relationship between a specific action of the vehicle occupant 30, that is to say in the specific example the entry of the motor vehicle 10, to respective operating states or methods of operation of the respective functional units 14, 16, 18, 20, 22.

Furthermore, it is, for example, also possible for the vehicle occupant 30 to predefine in the form of the voice command 28 as a rule that whenever the external temperature is below 0° C., the seat heater 18 is set to level 2, the seat heater 20 switches on and the air conditioning system 22 is set to its maximum temperature as soon as the vehicle occupant 30 gets into the motor vehicle 10. The vehicle occupant 30 can therefore also define, for example, conditions which relate to parameters of the surroundings of the vehicle, wherein the method of functioning of two or even more of the functional units 14, 16, 18, 20, 22 can be defined as a function of the satisfaction of such conditions.

With respect to the conditions which can be defined in a voice-based fashion, essentially it is possible to define all conditions which can be checked in the form of parameters which can be registered on the vehicle side. A wide variety of information channels and sensors of the motor vehicle 10 can be used for this. With respect to the weather it is, for example, also possible to use online information, wherein, for example, temperature sensors of the motor vehicle can also be used with respect to the external temperature.

The voice recognition apparatus 26 offers forms as an interface for the vehicle occupant 30 via which it can program in a voice-based fashion a wide variety of, in particular, even relatively complex and interleaved actions. The vehicle occupant 30 can particularly easily create respective rules in a voice-based fashion in the vehicle 10 entirely intuitively, without having to use particular tools or apps for this purpose.

The voice-based operator control additionally permits particularly easy and intuitive generation of further regulations, wherein the various regulations or rules can also be in turn revised or deleted in a voice-based fashion. The vehicle occupant 30 is as a result not loaded with complex lists, displayed representations or the like. All of the rules which are generated by the vehicle occupant 30 can be stored in a personalized fashion, for example, on the vehicle side in a memory apparatus (not illustrated) and/or also by a vehicle-external server apparatus. During the server-based storage there is additionally the possibility that the vehicle occupant 30 can also use the rules which have previously been defined by him not only in one vehicle but also in a plurality of vehicles. The personalized storage provides the advantage that by corresponding registering apparatuses it is possible to recognize on the vehicle side which user is currently seated in the vehicle, wherein rules which are respectively predefined in a user-specific fashion as a function of the user can be retrieved and implemented.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A control device for voice-based operation of a motor vehicle having functional units controlling operation of the motor vehicle, comprising:
   a voice recognition apparatus configured to recognize at least one voice command related to actuation of at least two of the functional units of the motor vehicle and uttered by a vehicle occupant, the at least one voice command including at least one condition and a relationship defined between one of the vehicle occupant entering and exiting the motor vehicle, and respective operating states of the at least two of the functional units; and a control apparatus configured to generate, in accordance with the at least one voice command recognized by the voice recognition apparatus, a rule for actuating the at least two of the functional units, based on the at least one condition and the relationship, and to actuate the at least two of the functional units according to the rule.

2. The control device as claimed in claim 1, wherein the control apparatus is configured to actuate the at least two of the functional units of the motor vehicle in accordance with the rule when the at least one condition is satisfied without the vehicle occupant uttering the voice command again.

3. The control device as claimed in claim 2, wherein the voice recognition apparatus is configured to revise or delete the rule in accordance with a further voice command, related to the rule and uttered by one of the vehicle occupant and another vehicle occupant.

4. The control device as claimed in claim 3, wherein the voice recognition apparatus is configured to recognize, based on at least one predefined instruction, whether the rule is to be carried out only once or the rule is to be stored until the rule is changed or deleted.

5. The control device as claimed in claim 4, wherein the control device is configured to store the rule in association with an identifier of the vehicle occupant in a memory of at least one of the motor vehicle and a vehicle-external server apparatus.

6. The control device as claimed in claim 5, wherein the voice recognition apparatus is configured to another relationship between at least one parameter related to surroundings of the vehicle and respective operating states of the at least two of the functional units.

7. The control device as claimed in claim 1, wherein the at least one parameter is a temperature of the surroundings of the vehicle.

8. The control device as claimed in claim 1, wherein the voice recognition apparatus is configured to recognize the relationship between the registered action of the vehicle occupant and respective operating states of the at least two of the functional units.

9. The control device as claimed in claim 1, wherein the voice recognition apparatus is configured to recognize another relationship between at least one parameter related to surroundings of the vehicle and respective operating states of the at least two of the functional units.

10. A motor vehicle, comprising:
at least two functional units controlling operation of the motor vehicle; and
at least one processor programmed
to recognize at least one voice command related to actuation of the at least two functional units of the motor vehicle and uttered by a vehicle occupant, the at least one voice command including at least one condition and a relationship defined between one of the vehicle occupant entering and exiting the motor vehicle, and respective operating states of the at least two of the functional units, to generate, in accordance with the at least one voice command, a rule for actuating the at least two functional units, based on the at least one condition and the relationship, and to actuate the at least two functional units according to the rule.

11. The motor vehicle as claimed in claim 10, wherein the at least one processor is configured to actuate the at least two functional units of the motor vehicle in accordance with the rule when the at least one condition is satisfied without the vehicle occupant uttering the voice command again.

12. The motor vehicle as claimed in claim 10, wherein the at least one processor is configured to recognize the relationship between the registered action of the vehicle occupant and respective operating states of the at least two functional units.

13. The motor vehicle as claimed in claim 10, wherein the at least one processor is configured to recognize another relationship between at least one parameter related to surroundings of the vehicle and respective operating states of the at least two functional units.

14. A method for voice-based operation of a motor vehicle, comprising:
recognizing, by a voice recognition apparatus, a voice command related to actuation of at least two functional units of the motor vehicle and uttered by a vehicle occupant, the voice command including at least one condition and a relationship defined between one of the vehicle occupant entering and exiting the motor vehicle, and respective operating states of the at least two of the functional units;

generating, by a control apparatus, a rule defining actuation of the at least two functional units in accordance with the voice command when recognized; and actuating, bythe control apparatus, the at least two functional units according to the rule.

15. The method as claimed in claim 14, wherein the actuating of the at least two functional units in accordance with the rule is performed when the at least one condition is satisfied without the vehicle occupant uttering the voice command again.

16. The method as claimed in claim 14, further comprising recognizing the relationship between the registered action of the vehicle occupant and the respective operating states of the at least two functional units.

* * * * *